United States Patent [19]

Bourne et al.

[11] Patent Number: 5,080,693
[45] Date of Patent: Jan. 14, 1992

[54] TRITIUM MONITOR AND COLLECTION SYSTEM

[75] Inventors: Gary L. Bourne; David H. Meikrantz, both of Idaho Falls, Id.; Walter E. Ely; Dale G. Tuggle, both of Los Alamos, N. Mex.; Ervin G. Grafwallner, Arco; Keith L. Wickham, Idaho Falls, both of Id.; Herman R. Maltrud, Los Alamos, N. Mex.; John D. Baker, Blackfoot, Id.

[73] Assignee: The United States of America as represented by the United States Department of Energy, Washington, D.C.

[21] Appl. No.: 674,981

[22] Filed: Mar. 26, 1991

[51] Int. Cl.$^5$ .............................................. B01D 53/00
[52] U.S. Cl. ......................................... 55/18; 55/66; 376/256; 376/245
[58] Field of Search ............... 376/256, 310, 313, 314, 376/146, 245; 55/210, 212, 162, 271, 273, 18, 66

[56] References Cited

U.S. PATENT DOCUMENTS

| | | | |
|---|---|---|---|
| 3,797,299 | 3/1974 | Nelson et al. | 73/19 |
| 3,937,649 | 2/1976 | Ridgely | 176/19 R |
| 4,019,867 | 4/1977 | Fabian | 23/260 |
| 4,178,350 | 12/1979 | Collins et al. | 423/248 |
| 4,470,955 | 9/1984 | Collins et al. | 422/159 |
| 4,663,113 | 5/1987 | Jester et al. | 376/256 |
| 4,976,938 | 12/1990 | Knize et al. | 423/249 |

Primary Examiner—Donald P. Walsh
Assistant Examiner—Chrisman D. Carroll
Attorney, Agent, or Firm—Bradley W. Smith; John M. Albrecht; William R. Moser

[57] ABSTRACT

This system measures tritium on-line and collects tritium from a flowing inert gas stream. It separates the tritium from other non-hydrogen isotope contaminating gases, whether radioactive or not. The collecting portion of the system is constructed of various zirconium alloys called getters. These alloys adsorb tritium in any of its forms at one temperature and at a higher temperature release it as a gas. The system consists of four on-line getters and heaters, two ion chamber detectors, two collection getters, and two guard getters. When the incoming gas stream is valved through the on-line getters, 99.9% of it is adsorbed and the remainder continues to the guard getter where traces of tritium not collected earlier are adsorbed. The inert gas stream then exits the system to the decay chamber.

Once the on-line getter has collected tritium for a predetermined time, it is valved off and the next on-line getter is valved on. Simultaneously, the first getter is heated and a pure helium purge is employed to carry the tritium from the getter. The tritium loaded gas stream is then routed through an ion chamber which measures the tritium activity. The ion chamber effluent passes through a collection getter that readsorbs the tritium and is removable from the system once it is loaded and is then replaced with a clean getter. Prior to removal of the collection getter, the system switches to a parallel collection getter. The effluent from the collection getter passes through a guard getter to remove traces of tritium prior to exiting the system. The tritium loaded collection getter, once removed, is analyzed by liquid scintillation techniques. The entire sequence is under computer control except for the removal and analysis of the collection getter.

14 Claims, 6 Drawing Sheets

TRITIUM MONITOR AND COLLECTION SYSTEM

CONTRACTUAL ORIGIN OF THE INVENTION

The United States Government has rights in this invention pursuant to Contract No. DE-AC07-76ID01570 between the United States Department of Energy and EG&G IDAHO INC.

BACKGROUND OF THE INVENTION

Tritium is a radioactive isotope of hydrogen with an atomic mass of three, a half life of 12.3 years and decays to stable helium-3 with the emission of an electron. Production of tritium by man occurs from basically two sources neutron irradiation of lithium and the capture of neutrons by deuterium in heavy-water. The primary source of tritium is associated with heavy-water reactors; however, bombarding of experimental gas cooled lithium targets with a neutron beam can also release small amounts of tritium. For the safety of reactor operating personnel and others who might come into contact with tritium, it is necessary to be able to monitor and collect the tritium produced.

Small amounts of tritium, in its gaseous state, are often mixed with fractional percent levels of hydrogen to facilitate its transfer through the respective piping used in its measurement and collection. Tritium, a weak beta emitter, is often present in small amounts in combination with other radioactive gases which emit both beta and gamma radiation. This combination together with the several possible chemical forms of tritium can make tritium difficult to measure. Most tritium monitoring systems rely on the use of an ion chamber that is nondiscriminating with respect to the form of ionizing radiation present in measuring the radioactivity of the gas sample; the ion chamber method of measurement results in both beta and gamma emitters combining to give a total result rather than supplying a reading for tritium alone as a single beta emitter. There are some commercially available devices which are capable of determining the radioactivity of the tritium alone from a gas stream; these generally involve the use of a dual ion chamber. With the dual ion chamber, the gas stream goes through one of the ion chambers that sees all of the radiations and a second chamber which is isolated from the gas flow and sees only the penetrating gamma-rays. The activity of the second chamber is then subtracted from the total activity recorded by the first chamber and the remainder is the tritium concentration provided that there are no other beta emitters. There are inherent problems associated with this technique because in some cases the gamma and beta emissions may be detectable by the total chamber and not be accounted for in the second or compensation chamber. Also, these tritium measuring devices function best at high concentrations of tritium and do not perform as well at low tritium concentrations.

Tritium collection is generally accomplished through the use of an oxidation process where the tritium is oxidized to tritiated water which is then trapped on silica gel or some other absorbent. This method precludes or greatly encumbers on-line analysis of the tritium activity as opposed to a system which employ zirconium alloy getters to collect, concentrate, and purify the tritium and provides a means of greatly improving on-line collection and provides the capability for on-line tritium monitoring.

In the case where a helium-argon gas mixture is used to stabilize the temperature of a lithium target subject to neutron bombardment, a small amount of tritium together with a large amount of gamma producing argon is formed. In order to measure the tritium activity, it is necessary to physically separate the argon from the tritium since the ratio of the tritium to the argon is often of the order of $10^{-7}$. There is no known device currently able to accomplish the separation of tritium from a radioactive or nonradioactive inert gas stream, collect the tritium, and measure the quantity of tritium and to further accomplish this under computer control so as to provide a system for long term collection and analysis of the tritium.

Therefore, it is an object of this invention to provide an apparatus to collect and measure the tritium from a flowing inert gas stream.

It is another object of this invention to purify the gas to the degree that all tritium molecular species will be converted to an elementary pure gas containing only the isotopes of hydrogen.

It is another object of this invention to interface a computer and software system with the collecting and measuring hardware to provide for automatic control of the system.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The tritium monitor and collection system provides a means of separating the tritium from other non-hydrogen isotope contamination gases, radioactive or not, and then measuring the tritium activity on-line. The system is based on a series of getters in combination with ion chambers to isolate the tritium and measure its activity. The collected tritium can be physically removed from the system and the residual gas vented to a decay container. Throughout the process except for the removal of a loaded collection getter, the entire process is under computer control.

DETAILED DESCRIPTION OF THE INVENTION

The current function of the tritium monitor and collection system is to collect and analyze the tritium that leaks from New Production Reactor High Temperature gas cooled lithium targets. These targets are under evaluation for use in a new reactor concept. As the tritium leaks from the target, the subject invention collects the tritium, separates it from a radioactive or nonradioactive inert gas stream, and analyzes the activity of the tritium which has leaked from a particular target.

The gas stream is generated when a helium-argon gas mixture is used to regulate the temperature of the target subject to neutron bombardment. During this process, some of the argon is converted to radioactive argon 41, a gamma emitter, and a small amount of tritium is produced. To aid in moving the tritium through the lines the inert gas mixture is mixed with hydrogen gas to form a 0.5% hydrogen mixture. The line from the experiment is linked to the input line for the tritium monitor and collection system.

The tritium monitor and collection system will collect tritium from a flowing gas stream and measure tritium on-line. The system will separate the tritium from other non-hydrogen isotope contaminating gases, radioactive or not. The system is based upon various zirconium alloys combined in a device called a getter and on an in-line ion chamber. The getters are commercially available in various configurations to conform to specific collecting requirements. The getters will adsorb tritium, in any of its common forms, at one temperature and release the tritium as a gas at a higher temperature; as a result, all of the getters are equipped with heaters. The system is under computer control and the only operator attention that is necessary is the removal of the appropriate collection getter and its transportation to a tritium removal furnace train. This represents a novel use of zirconium based getters which, in the past, have been utilized primarily to scavenge reactive gases from vacuum systems and also as a storage media for hydrogen and its isotopes.

Figure 1:
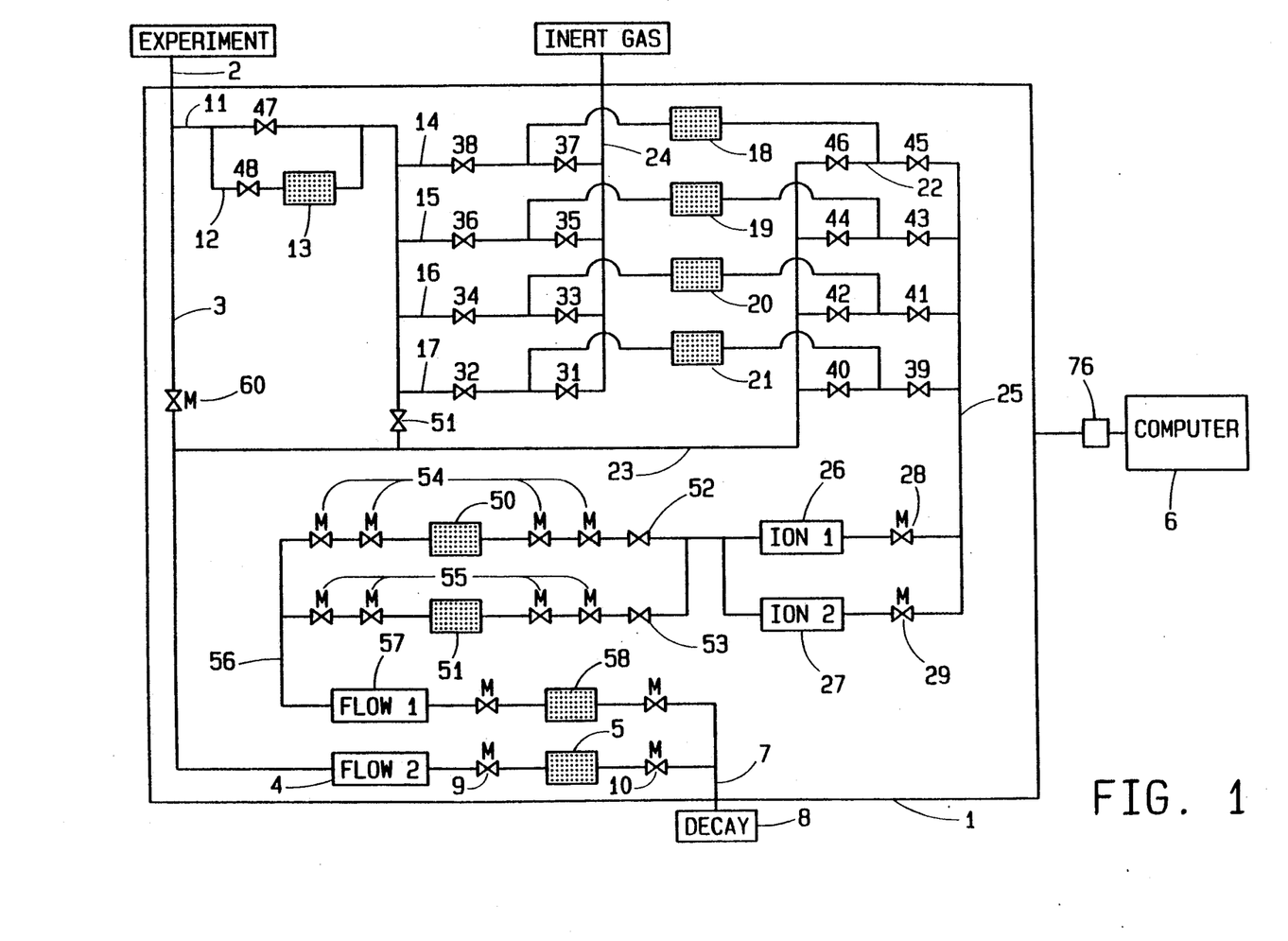
FIG. 1 is a schematic of the system hardware.

FIG. 1 depicts a schematic of the tritium monitor and collection system. The tritiated gas generated by the experiment enters the monitor-collection apparatus, 1, through process line 2. In the event of a system shut down, manual valve 60 can be opened dumping the tritiated gas through line 3 which is sequentially coupled to a flow meter, 4, and a guard getter, 5. The measured flow from the flow meter, 4, is communicated via an electrical connection from the flow meter, 4, to a CAMAC Crate, 76, where the CAMAC Crate, 76, functions as the interface between the monitor-collection apparatus, 1, and the process control and monitoring computer, 6. The signal from the flow meter, 4, is then transmitted electrically from the CAMAC Crate, 76, to the process control and monitoring computer, 6. The guard getter, 5, is composed of 189 g of ST-707 pills and has a tritium collection efficiency of 99.9%. After passing through the guard getter, 5, the residual gas stream is transported by flow line 7 to a decay storage container, 8. The decay storage container, 8, acts as a holding area for the gas until the argon 41 can decay to its nonradioactive form. Guard getter, 5, is bounded on either side by a set of manual control valves, 9 and 10, which allow the guard getter to be isolated and the tritium containing pills to be removed.

During normal operation, valve 60 will remain closed and the tritiated gas will flow through process line 11. In the initial phase of the operation automated valve 47 is closed and automated valves 48 and 51 are opened, this serves to shunt the tritiated gas from line 11 to line 12 for the purpose of cleaning the system of gases such as water vapor, oxygen, carbon dioxide, carbon monoxide, and other gases which are reactive with the zirconium alloy which make up the active part of the getter. If left in the initial gas stream, these gases would poison the getter components within the system since many of the getter reactive gases are not released from the zirconium alloys by heating as is tritium and thus, some of the getters such as the on-line getters would not function properly if exposed to these gases.

The tritium is collected in the protective getter, 13, and the guard getter, 5. Valves 47, 48, and 51 are linked to and controlled by the computer and its associated software, 6. After the initial start-up period, lasting approximately a week or less, is complete, valves 48 and 51 are closed and valve 47 is opened; this actuation occurs on command from the computer, 6. During normal operation, with valve 51 closed, the tritiated gas stream is directed to one of four identical on-line getter subsystems identified by process lines 14, 15, 16, and 17. Two of the on-line getter subsystems can act as the primary subsystems with the remaining on-line getter subsystems acting as backup subsystems. The two primary on-line getter subsystems are activated for one of two operations in a sequential and cyclical order with only one subsystem acting on a specific operation at a given time. The sequencing is under the control of the external computer system, 6. The first operation involves the tritiated gas stream entering process line 14 when the computer directs the opening of valve 38. At the same time as valve 38 is opened valves 31–37 remain closed. For a 0.5% H2 in helium/argon gas stream and at a flow rate of 100 sccm, the on-line getters, 18–21, which are composed of 10 ST-727 pills (6 grams) have a collection efficiency at the end of three hours collecting of greater than 99.9%. After flow through the on-line getter, 18, the residual gas stream passes to process line 22 and through valve 46 which was opened by the external computer at the same time as valve 38. Valves 39–45 remain closed. The residual gas stream containing the helium and radioactive argon, then passes through process lines 23 and 3 and interacts with flowmeter, 4, which transmits the gas flow rate to the computer, 6. The gas then passes through the guard getter, 5, which absorbs any traces of tritium not picked up by the on-line getter, 18. The remainder of the gas stream then flows into the decay storage container, 8.

Once the active on-line getter, 18, has collected tritium for a predetermined period of time, it is valved off by closing valves 38 and 46 while simultaneously the next on-line getter, 19, is valved on by opening valves 36 and 44; these operations are all under computer control. The previous active on-line getter, 18, is cleaned of any residual gases by opening valves 37 and 46 allowing a pure helium purge to flow through line 24, the on-line getter, and then through line 25 to one of the ion chambers, 26 and 27. The computer, 6, then increases the temperature of the on-line getter, 18, raising the tritium vapor pressure and releasing the tritium gas. Valves 37 and 45 remain open allowing pure helium gas to flow through line 24 and through the heated on-line getter, 18, placing the newly released tritium gas in an inert helium stream. The tritium in the inert helium gas stream is more highly concentrated than it was in the initial gas stream, thus, allowing for a lower detection limit for the tritium. The newly formed tritium-helium gas stream flows through line 25 to one of two ion chambers, 26 and 27. One of the ion chambers acts as the primary and the other as a secondary chamber. Switching from the primary to the secondary chamber is accomplished by closing either manual valve 28 or 29 and opening the alternate valve. The ion chambers, 26 and 27, measure the tritium activity, and this information is transmitted to the computer, 6. The lower level of tritium detectability for the on-line getters is approximately 20 microcuries. The effluent from the ion chamber is then passed to one of two collection getters: the primary, 50 and the secondary, 51. Only one of the collection getters is in operation at a time. The collection getters contain 50 g of ST-727 pills. These getters can hold the equivalent of 66 hours of 0.5% hydrogen in helium at a flow rate of 100 sccm. The active collection getter, 50 or 51, absorbs approximately 99.9% of the tritium and has a lower level of detectability of $10^{-5}$ microcuries following unloading. Once the collection getter is loaded, the computer shuts valve 52 and opens valve 53. This shifts the gas stream to the secondary getter, 51. Each of the collection getters is bounded by a set of manual valves, 54 and 55, which isolates the respective collection getter and permits the removal of the loaded collection getter and allows the installation of a fresh collection getter in its place.

The effluent from the collection getter flows through line 56 to the primary flow meter, 57, where the flow is measured and transmitted to the computer, 6. The effluent then flows to the primary guard getter, 58, which removes further traces of tritium prior to the exiting to the decay storage container, 8.

Figure 2:
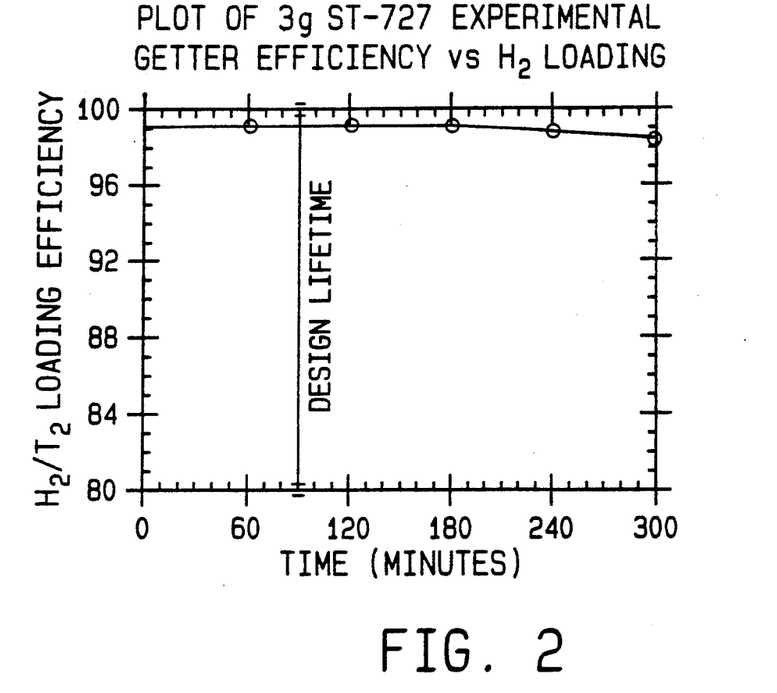
FIG. 2 displays the on-line efficiency for a getter using ST-727 as a function of the hydrogen loading.

FIG. 2 displays the on-line efficiency for a getter using 3 g of ST-727 as a function of hydrogen loading under conditions which might be experienced by the on-line getters, 18–21. From FIG. 2, one can see that the efficiency of the getter decreases very slowly as a function of the total hydrogen absorbed. An accelerated hydrogen loading test was performed on the guard getters. The accelerated test increased the ratio of hydrogen to getter to 15. The initial collection efficiency dropped to 98% as compared to a normal operating efficiency of 99.9%. When the flow was reduced from the accelerated to the normal rate for the guard getters the efficiency returned to greater than 99% from the accelerated collection rate of 98%. This illustrated that in the event of total system failure, the guard getters could handle the experiment purge gas until experiment shutdown.

Figure 3:
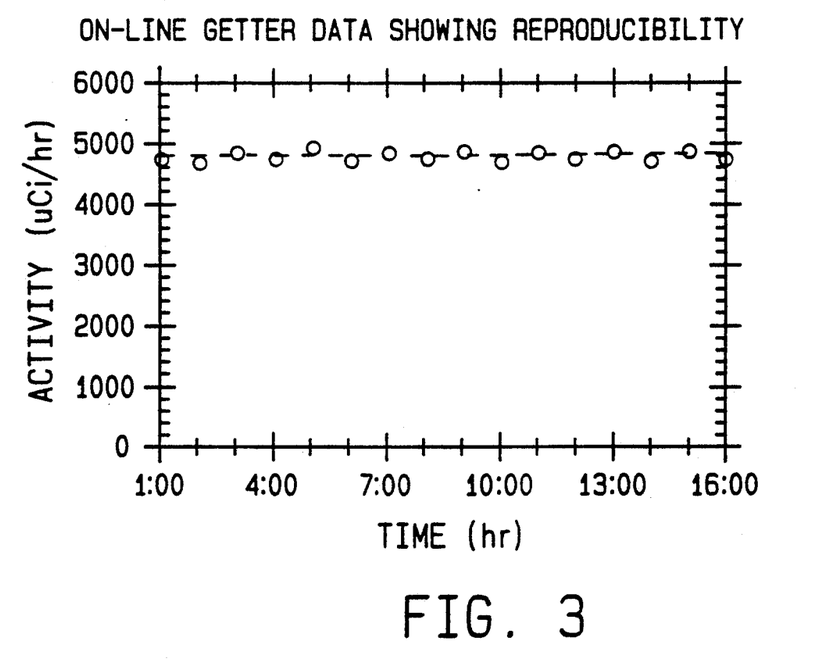
FIG. 3 displays the reproducibility of the results from the on-line getter.

The on-line getters were tested for reproducibility in collecting tritium. This test was accomplished by running the system using a tritium spiked gas in a mixture of 0.5% hydrogen in a helium/argon stream. FIG. 3 shows the plot of 16 consecutive analyses.

Figure 4:
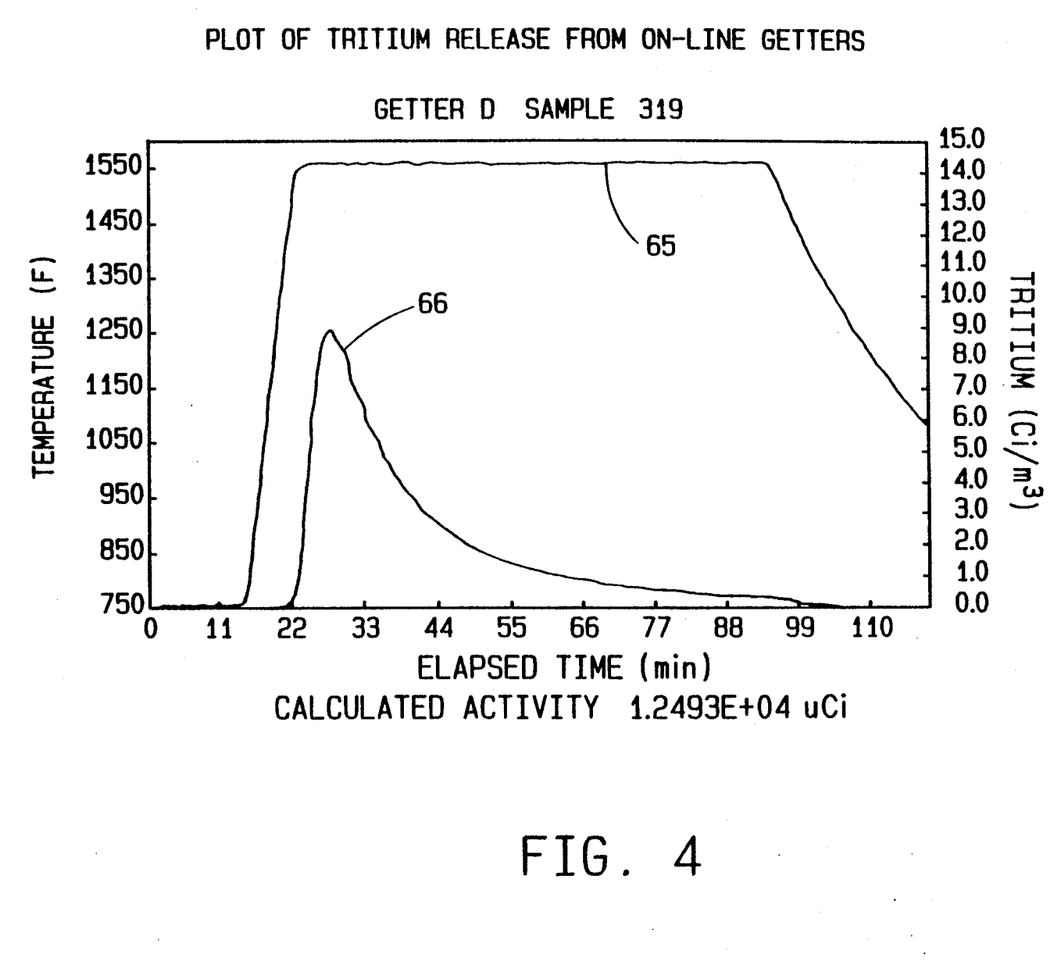
FIG. 4 depicts a plot of the tritium removal capability from an on-line getter as a function of the temperature.

FIG. 4 depicts a plot of the tritium removal from one of the on-line getters relative to the temperature of the getter where curve 65 represents the temperature of the getter and curve 66 represents the changes in the tritium concentration.

Figure 5:
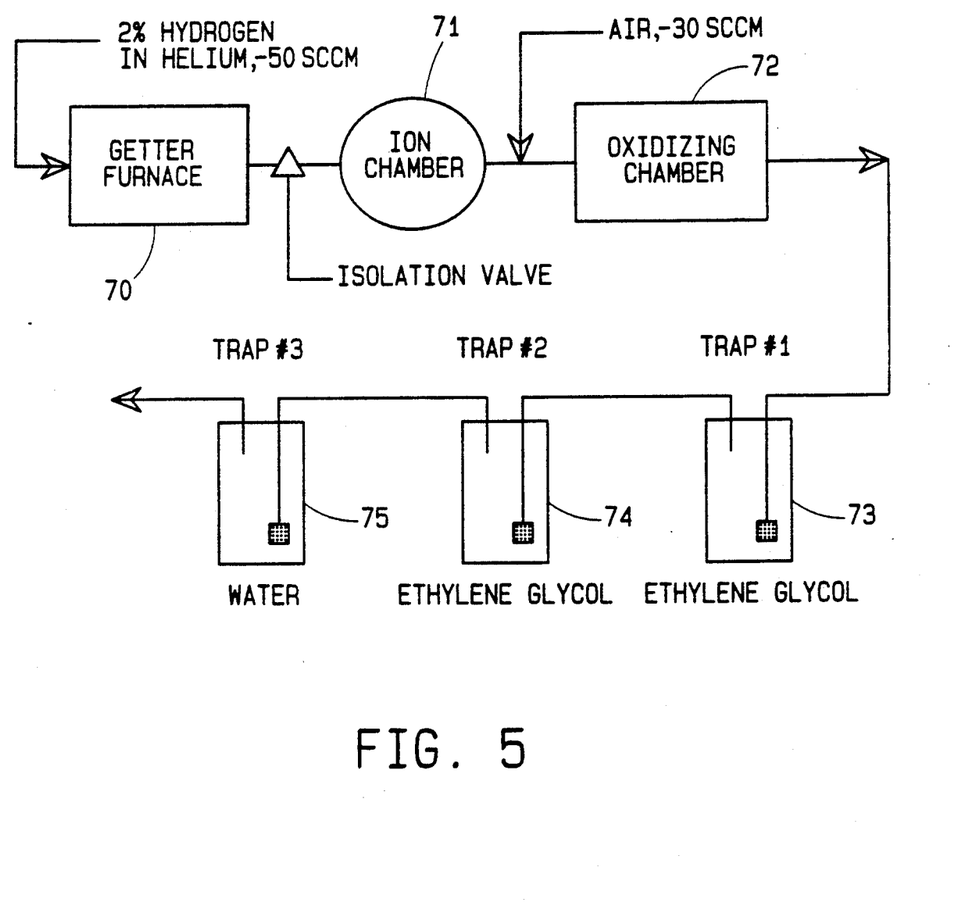
FIG. 5 shows a schematic of the collector getter tritium removal furnace train.

FIG. 5 depicts a schematic of the collector getter tritium removal furnace train. Following removal of the collector getter, 50 or 51, from the system, the getter is placed in an inert atmosphere glove box and disassembled. The getter material is placed in two ceramic boats which are then placed into a mullite ceramic tube. The mullite ceramic tube is valved shut at either end and removed from the glove box. The ceramic tube is then placed in the furnace, 70. The tritium was removed by heating the furnace, 70, to 900C. and flowing 2% hydrogen in helium at approximately 50 sccm through the tube and into the ion chamber, 71. It takes approximately 16 hours to remove 99.9% of the tritium as determined by the ion chamber, 71. When the tritium removal is completed as determined by the activity reading from the ion chamber, 71, the ceramic tube is valved shut and returned to the inert atmosphere of the glove box. The ion chamber is not required for normal getter unloading operations once the required parameters have been established. The clean getter material is loaded back into the collection getter cylinder and returned to the tritium monitor when the next collection getter is installed. The liberated tritium is oxidized to water in the oxidation chamber, 72. The water is then trapped primarily in the first trap, 73, which traps approximately 99.9% of the tritium. The water is further exposed to the second and third traps, 74, and, 75, respectively.

The thermocouples, attached to heated components within the system, the valves of the system and the instruments in the glove box are interfaced to the computer using a CAMAC crate, FIG. 1, 76. In-general the valves for the system operate by the following technique: the computer controls an electrically activated valve which controls the air flow to the valves which in turn are air activated to an open or closed position; the position of the valves whether opened or closed is then confirmed by information conveyed back to and displayed by the computer. There are two exceptions to this, the normally open valves, FIG. 1 valves 47 and 51, do not have position sensors. These valves provide an active flow path through guard getter 5 in the event electrical power is lost. Each on-line getter has an output from the computer controlling the heater and an input from a thermocouple attached to the getter which reports the temperature of the on-line getter to the computer. A thermal limit switch is connected to a second thermocouple on each on-line getter; the thermal limit switch cuts the power to the getter heater when the temperature reaches or exceeds a predetermined value. The output from the flow meters is linked to an analog to digital converter with a range of from 0 to 10 volts. The digital output is then transmitted to the computer which in-turn converts the digital output to a given gas flowrate. The response from the ion chamber is stored in two forms in the computer: first as a raw voltage signal and second as the converted value of the voltage to a radiation value in millicuries. There is also a thermocouple measuring the ambient temperature in the glove box and a digital flow sensor monitoring the cooling air exhaust from the glove box. These allow the computer, 6, to provide a warning should there be a failure of the external exhaust system.

Figure 6:
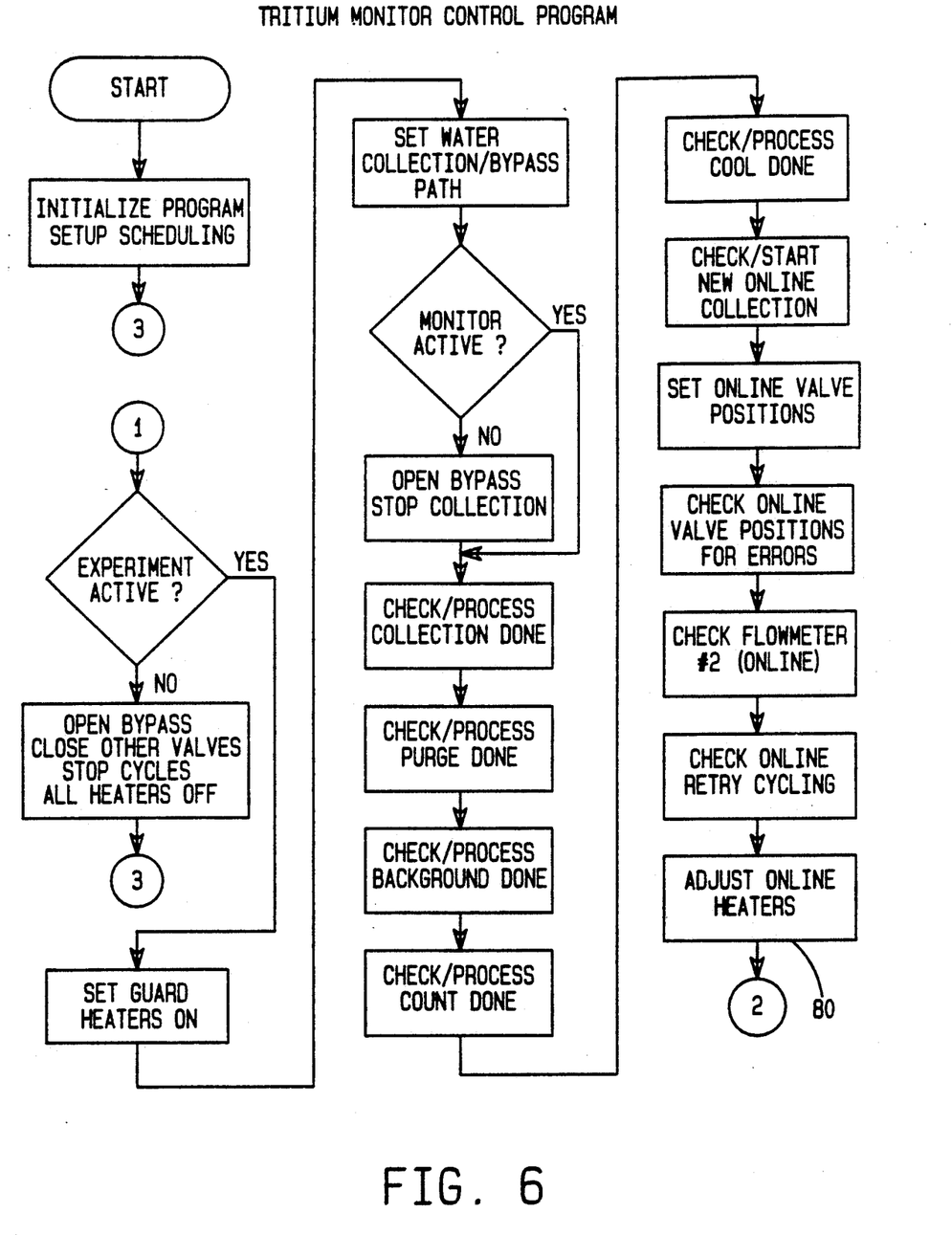
FIG. 6 depicts the first page of a two page flow chart of the computer software used with the computer hardware to monitor and control the system.
Figure 7:
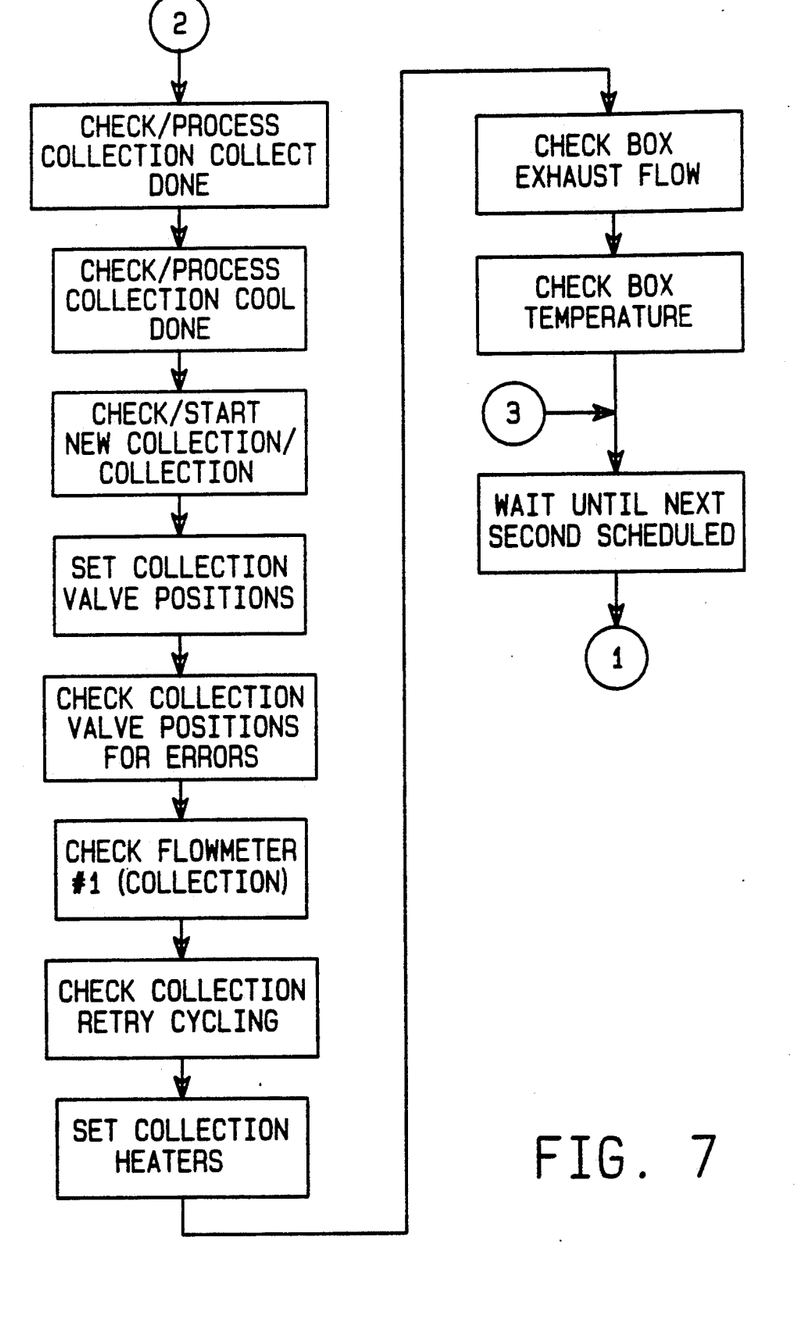
FIG. 7 depicts the second page of a two page flow chart of the computer software used with the computer hardware to monitor and control the system.

FIGS. 6 and 7 depict the flow chart for the tritium monitor control program. The flow chart represents the core of the computer software which controls the timing of the cycles and the positioning of the valves. The on-line heater logic, 80, has special logic to cycle the heaters on and off to achieve temperature control without overshoot. Loss of flow in the collection getters as measured by the flow meters triggers an alarm in the system causing the valves to switch the flow to the other collection getter. If the switch does not correct the problem then the gas flow is switched off-line and through the secondary guard getter. When loss of flow occurs during the on-line sampling the computer cycles the valves in such a manner as to try and establish flow in one of the other on-line getters. If this does not occur, then the computer directs the on-line sampling off-line and again routes the gas through the secondary guard getter. The orderly shutdown of the system is accomplished through a special computer logic sequence.

The status of various subsystems is monitored on a real time basis. The status of the tritium monitor is displayed as well as the status of the temperature at key points in the system. The P&ID flow diagram displays the valve positions and monitors the flow through the system. The following computer displays are also present: a thermocouple display, a tritium trend display, a temperature trend display, and an ion chamber plot. In addition, the computer system can display other physical parameters associated with the system and can archive the information obtained.

The tritium collection and monitoring system is the first system that will capture 99.999% of the tritium in a flowing inert gas stream, purify it, analyze it, and recollect it for recovery or further analysis. It is entirely computer controlled and only requires an operator to remove the final collection getter assemblies. The tritium monitor and collection system was performance tested for a total of 24 run days with the final seven days entirely under computer control. Using all four getters, there were a total of 204 separate on-line samples analyzed having a standard deviation of 2.9% about the mean. The lower level of detectability (LLD) for the on-line getters, using a 20 cc ion chamber, was determined to be approximately 20 microcuries. The LLD for tritium driven off the final collection getters, oxidized, and liquid scintillation counted is approximately $10^{-5}$ microcuries.

The embodiments of this invention in which an exclusive property of privilege is claimed are defined as follows:

1. A method using a tritium collection and monitoring system to collect and measure the tritium in an initial gas stream containing tritium along with a collection of other gases comprising:
    employing computer control means to direct the initial gas stream to a protective collection means, during an initial phase of operation, by controlling a first set of valves where said protection collection means serves to prevent contaminants from reaching sensitive parts of the system during the initial phase of the operation; using said computer control means and said first set of valves to direct the initial gas stream to one of a plurality of on-line collecting means and where said on-line collecting means acts to remove tritium from the initial gas stream;
    using said computer control means to direct a residual gas stream emitted from said on-line collection means to a primary flow meter and subsequently to a guard collecting means to further remove remaining tritium in said residual gas stream and then to a decay chamber;
    employing said computer control means to cycle the initial gas stream from a tritium loaded on-line collection means to an unloaded on-line collection means;
    heating said tritium loaded on-line collecting means and simultaneously using said computer means to valve an inert gas stream to said loaded on-line collecting means where the heating of the tritium loaded on-line collecting means introduces the previously removed tritium into said inert gas stream to form a newly tritiated gas stream;
    using said computer control means to direct said newly tritiated gas stream to a measuring means;
    passing said tritiated gas stream through said measuring means to determine a tritium activity level associated with said newly tritiated gas stream;
    passing said tritiated gas stream through a collection means to remove the tritium from said tritiated gas stream to create a second residual gas stream;
    passing said second residual gas stream through a guard collection means to remove remaining tritium from said second residual gas stream.

2. The method of claim 1 wherein said protective collection means is operative during the initialization of the system for the purpose of isolating the remainder of the system from a plurality of components present during the system initialization which could prove harmful to the system.

3. The method of claim 2 in which said protective collection means is under the control of said computer control means and includes a system of computer controlled valves which directs said initial gas stream sequentially to a protective getter, a secondary flow meter, a secondary guard getter, and to said decay chamber.

4. The method of claim 3 in which the response of said secondary flow meter is transmitted to said computer control means.

5. The method of claim 1 wherein a emergency manual valve can be actuated to divert the initial ga stream directly to said secondary flow meter and subsequently to said secondary guard getter and said decay chamber.

6. The method of claim 1 wherein said computer means can cycle the flow of said newly tritiated gas stream from a tritium loaded collection means to an unloaded collection means when either said primary collection means or a secondary collection means achieves the tritium loaded condition.

7. The method of claim 6 where said loaded collection means can be isolated by a plurality of manually operated valves and removed from the system whereupon said loaded collection means is cleaned of its tritium by means of a tritium removal furnace train analyzed by a liquid scintillation technique and returned to the system.

8. The method of claim 1 wherein a set of manually controlled valves directs said newly tritiated gas steam to either the primary ion chamber or to a secondary ion chamber operating in parallel with said primary ion chamber.

9. The method of claim 1 wherein a plurality of backup on-line collection means can be brought on line by said computer means in the event one of the plurality of active on-line collection means fails.

10. An apparatus for collecting and measuring the tritium from an effluent gas stream containing tritium and other radioactive and non-radioactive gases comprising:
    computer means for controlling the flow path of the effluent gas stream, for controlling a series of gas streams subsequently modified from the effluent gas stream, and for receiving status data from select components within the apparatus;
    a first line connecting the incoming effluent with a first and a second valve both of which are linked to and under the control of said computer means;

a protective means for removing tritium and other materials which might adversely effect the apparatus from the effluent gas stream during a period of time after start-up where said protective means is coupled to said second valve;

a plurality of on-line collection means which, after the initial start-up, act on the effluent to remove tritium from the effluent gas stream and to reintroduce the tritium to an inert gas stream where the flow of the effluent gas stream and said inert gas stream to a specific on-line collection means is under the control of said computer means and is coupled to said first valve;

a secondary flow meter coupled to said on-line collection means which measures a gas flow rate of a residual gas stream formed from the effluent as the tritium is being removed by said on-line collection means and which transmits this information to said computer means;

a secondary guard collection means for removing tritium from said residual gas stream where said secondary guard collection means is coupled to said secondary flow meter;

a primary measuring means coupled to said on-line collection means for measuring the quantity of tritium in said inert gas stream and which is activated by operation of an upstream valve;

a secondary measuring means coupled to said on-line collection means and parallel to said primary measuring means for use as a back-up to said primary measuring means wherein the activation of said secondary measuring means is controlled by said computer via an upstream valve;

a primary collecting means linked to said primary measuring means and said secondary collecting means and bounded at both ends by a set of valves which permit said primary collecting to be removed from the system and replaced with a clean collecting means where said primary collecting means functions to collect the tritium from said inert gas stream;

a secondary collecting means for performing the same operation as the primary collecting means which is positioned parallel to said primary collecting means and is activated by a plurality of valves when said primary collecting means is removed from the system;

a primary flow meter linked to said primary and secondary collecting means where said primary flow meter measures an applied gas flow and relays said gas flow measurement to said computer;

a primary guard collecting means coupled to said primary flow meter where said primary guard collecting means operates on the gas stream experienced by said primary flow meter to remove any tritium left in the gas flow;

a decay container means linked to said primary guard collector to permit any residual radioactive material to decay.

11. The apparatus of claim 10 where said on-line getter means includes a plurality of entrance valves under control of said computer which function to control the influx of gas,
a source of inert gas coupled to said entrance valves,
an on-line getter linked to said entrance valves and containing an alloy of zirconium to adsorb tritium from the gas stream flowing into said on-line getter,
a heater coupled to said on-line getter and under the control of said computer,
a plurality of exit valves which control the direction of flow of an exit effluent whose path is dependent on said computer control.

12. The apparatus of claim 10 wherein said primary and secondary measuring means are ion detection chambers linked in a parallel arrangement so that one of said chambers acts as a back-up for said chamber actively in operation.

13. The apparatus of claim 10 in which said primary and secondary collection means are getters based on alloys of zirconium.

14. The apparatus of claim 10 in which the guard collection means are getters based on alloys of zirconium.

* * * * *